(12) United States Patent
Hashida et al.

(10) Patent No.: US 6,904,548 B2
(45) Date of Patent: Jun. 7, 2005

(54) TRANSMISSION CHARACTERISTIC COMPENSATION SCHEME

(75) Inventors: Masaaki Hashida, Kawasaki (JP); Hiroshi Nishimoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 465 days.

(21) Appl. No.: 10/077,977

(22) Filed: Feb. 20, 2002

(65) Prior Publication Data

US 2003/0056159 A1 Mar. 20, 2003

(30) Foreign Application Priority Data

Sep. 18, 2001 (JP) ...................................... 2001-283803

(51) Int. Cl.[7] .............................................. G06F 11/00
(52) U.S. Cl. ........................ 714/704; 714/746; 714/752
(58) Field of Search ................................ 714/704, 751, 714/752, 746; 702/72, 69; 455/9, 8

(56) References Cited

U.S. PATENT DOCUMENTS

| 3,959,770 A | * | 5/1976 | Schaefer ..................... 714/715 |
| 6,307,988 B1 | | 10/2001 | Eggleton et al. |
| 6,742,154 B1 | * | 5/2004 | Barnard ...................... 714/752 |

FOREIGN PATENT DOCUMENTS

| EP | 0 684 709 A1 | 11/1995 |
| EP | 1 065 813 A2 | 1/2001 |
| JP | 2000-244394 | 9/2000 |
| JP | 2001-77756 | 3/2001 |
| WO | 01/67644 A1 | 9/2001 |

OTHER PUBLICATIONS

Ohn, M.M., et al., "Tunable fiber grating dispersion using a piezoelectric stack", *OFC '97 Optical Fiber Communication Conference and Exhibit: Tecnical Digest*, vol. 6, pp. 155–156.

Shirasaki, M., "Dispersion Compensation Using the Virtually Imaged Phased Array", *APCC/OECC '99*, Oct. 18–22, 1999, pp. 1367–1370.

Noe, Reinhold, et al., "Polarization Mode Dispersion Compensation at 10, 20, and 40 Gb/s with Various Optical Equalizers", Journal of Lightwave Technology, IEEE, vol. 17, No. 9, Sep. 1999.

\* cited by examiner

*Primary Examiner*—Phung My Chung
(74) *Attorney, Agent, or Firm*—Staas & Halsey LLP (57) ABSTRACT

A control direction circuit (24) provides at least one of code error information and code error correction information on a transmission signal for which compensation has been performed by a plurality of compensation circuits (20a through 20e), to respective ones of the plurality of compensation circuits. Thus, the control direction circuit (24) controls each of the compensation circuits individually based on the thus-provided at least one of the code error information and code error correction information so as to compensate the waveform degradation on the transmission signal.

18 Claims, 7 Drawing Sheets

TRANSMISSION CHARACTERISTIC COMPENSATION SCHEME

BACKGROUND OF THE INVENTION

1. Field of the Invention

The present invention relates to a transmission characteristic compensation control scheme, in particular, a transmission characteristic compensation control scheme in which a plurality of compensation circuits are used for compensation of transmission characteristic degradation.

2. Description of the Related Art

In recent years, in improvement in transmission rate in an optical transmission device, an optical transmission device 10 Gb/s has been already put in practical use. As for an optical transmission device of 40 Gb/s, development has also been preceded. Thus, in an optical transmission device, degradation in optical signal waveform due to wavelength dispersion in optical fiber, polarization dispersion in optical fiber or optical circuit, non-linear effect, amplified spontaneous emission (ASE) or the like may become remarkably problematic and thus, may limit permissible transmission distance thereof.

Accordingly, in case transmission is made for hundreds of km or more by an optical transmission device of 40 Gb/s, a plurality of transmission characteristic compensation control systems for compensation of degradation in optical signal waveform occurring due to various factors mentioned above are required.

For example, an example of a transmission characteristic compensation control system which compensates transmission characteristic degradation using a plurality of compensation circuits is disclosed in Japanese Laid-Open Patent Application No. 9-326755. Therein, a plurality of compensation circuits, such as, for example, a variable dispersion equalizing circuit, and so forth, and a control circuit which controls the compensation circuits are separately provided, and, the control circuit performs control of the plurality of compensation circuits in a centralized manner.

However, in such a transmission characteristic compensation control scheme, the control circuit performs centralized control of the plurality of compensation circuits, and thus, in case the number of compensation circuits increases, control by the control circuit should become complicated.

Therefore, this type of transmission characteristic compensation control scheme may have a problem that it is difficult to increase the number of compensation circuits according to a rise in transmission rate, extension of transmission distance, etc. Thus, it may not be sufficiently flexible or may not have a sufficient adaptability with regard to system extension and system modification.

For such a transmission characteristic compensation control scheme, a so-called "simple method" and a "two-dimensional method" have been proposed for parameter searching method in compensation circuits.

The simple method is a method by which, in case there are two types of control objects, parameters are set for providing a minimum code error rate on the first control object, and, then, the parameters are set again for providing a minimum code error rate on the second control object. However, as the two parameter are not individual in general, it was not possible to provide a sufficient accuracy on code error compensation by the simple method.

The two-dimensional method is a method in which, code error measurement is made on all the combinations of the two types of control objects, and, then, the optimum parameters are obtained from the measurement result. However, the two-dimensional method needs to increase the number of combinations for improving the accuracy on searching the optimum parameters concerning the compensation operation, and, improvement in the accuracy should result in increase in time required for control of the compensation circuits. Moreover, in control of the compensation circuits at a time of actual operation, circuit switching etc. may take place as error increases. This may make the compensation control more complicated. Accordingly, it may not be realistic to perform code error measurement on all the combinations of control objects according to the two-dimensional method.

SUMMARY OF THE INVENTION

The present invention has been made in view of the above-mentioned problems, and aims at providing a transmission characteristic compensation control scheme having improved extendibility and pliability, which enables improvement in reliability of the transmission system.

In order to achieve this object, according to the present invention, a novel scheme of compensating waveform degradation on a transmission signal by using a plurality of compensation circuits, comprising the steps of:

a) providing at least one of code error information and code error correction information on the transmission signal for which the compensation has been performed by the plurality of compensation circuits, the plurality of compensation circuits; and b) controlling each of the plurality of compensation circuits individually based on the thus-provided at least one of the code error information and code error correction information so as to compensate the waveform degradation on the transmission signal.

Thereby, as control of each one of the plurality of compensation circuits is performed independently, waveform degradation compensation can be performed by effectively simpler control operation in total even when the number of compensation circuits increases. As a result, extendibility and flexibility of the transmission characteristic compensation control system can be effectively improved through a simpler configuration.

In particular, it is preferable that the code error information or code error correction information on the transmission signal for which the compensation has been made by the plurality of compensation circuits is provided to the respective ones of the plurality of compensation circuits one by one, and, thus, only one of the plurality of compensation circuits simultaneously. Thereby, only one of the plurality of compensation circuits performs compensation control operation simultaneously. As a result, the waveform degradation compensation can be performed by further effectively simpler control operation in total even when the number of compensation circuits increases. Thereby, extendibility and flexibility of the transmission characteristic compensation control system can be further effectively improved by a simple configuration of a control unit which controls the waveform degradation compensation in total of the system.

BRIEF DESCRIPTION OF THE DRAWINGS

Other objects and further features of the present invention will become more apparent from the following detailed description when read in conjunction with the following accompanying drawings.

DESCRIPTION OF THE PREFERRED EMBODIMENT

Figure 1:
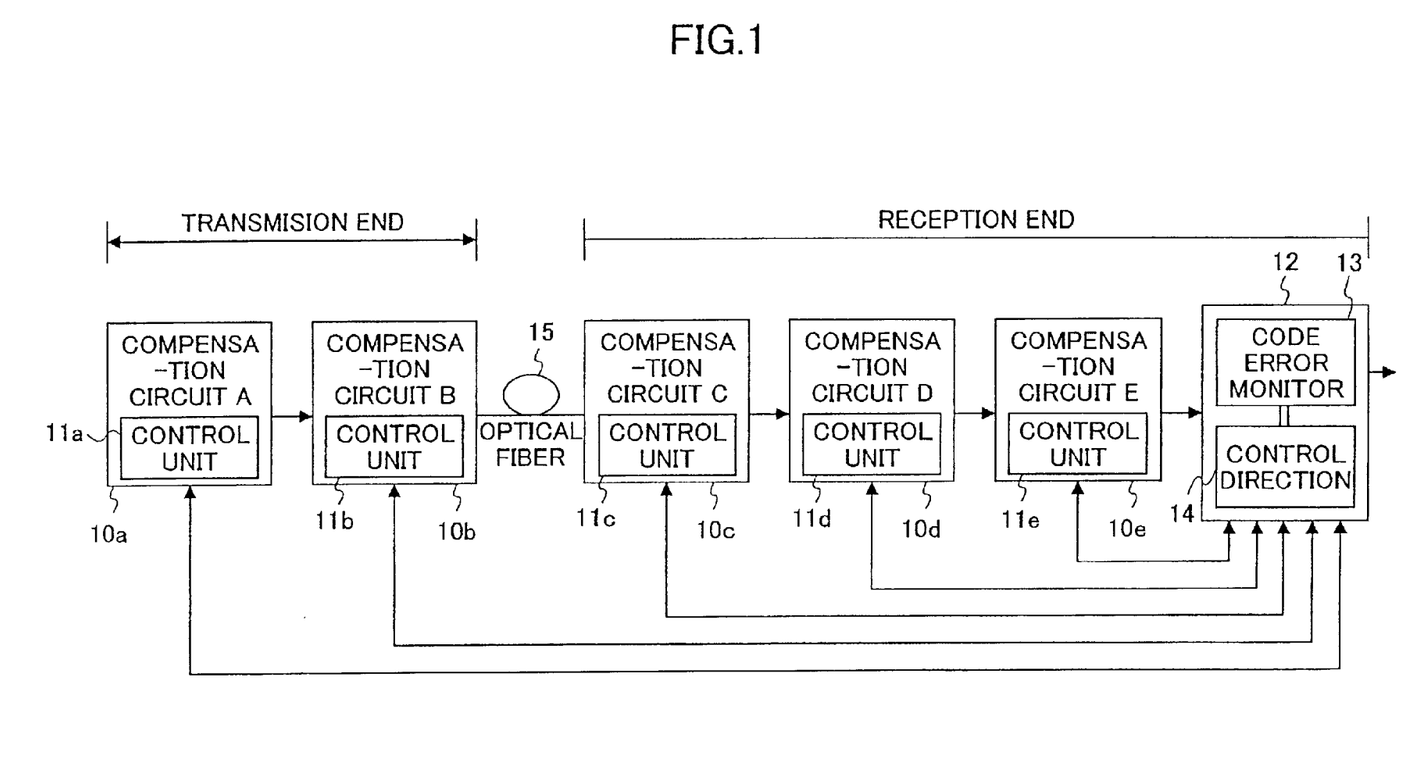
FIG. 1 illustrates a principle of the present invention.

A preferred embodiment of the present invention will now be described based on the drawings. Referring to FIG. 1, a principle of the present invention will now be described for easy understanding of the present invention.

FIG. 1 illustrates a principle of the present invention. In FIG. 1, while compensation circuits 10a and 10b are arranged at a transmission end, compensation circuits 10c through 10e and a transmission characteristic compensation control device 12 are arranged at a reception end, of optical signal transmission. In addition, the transmission and reception ends are connected through an optical fiber 15. The compensation circuits 10a through 10e compensate waveform degradation on a transmission signal according to predetermined parameters set up therein.

The compensation circuits 10a through 10e arranged at the transmission or reception ends include control units 11a through 11e, respectively. The control units 11a through 11e set up the respective parameters in the compensation circuits 10a through 10e based on code error information. However, the control units 11a through 11e may set up the parameters in the compensation circuits 10a–10e based on rather code error correction information instead.

In case setting up of the parameters in the compensation circuits 10a through 10e is made based on code error information, the code error information is supplied to the control units 11a through 11e from the transmission characteristic compensation control device 12. However, in case the setting up of the parameters in the compensation circuits 10a through 10e is made based on rather code error correction information, code error correction information is supplied to the control units 11a through 11e also from the transmission characteristic compensation control device 12.

The transmission characteristic compensation control device 12 is configured such as to have a code error monitoring circuit 13 and a control direction circuit 14. The code error monitoring circuit 13 measures at least one of code error information and code error correction information on a transmission signal for which waveform degradation has been compensated in passing through the compensation circuits 10a through 10e, and supplies the thus-measured at least one of the code error information and code error correction information to the control direction circuit 14.

Although a case where the parameters in the compensation circuits 10a through 10e are set up based on code error information will now be described, the same manner can be applied in a case where setting up of the parameters in the compensation circuits 10a through 10e are made based on code error correction information.

Figure 2:
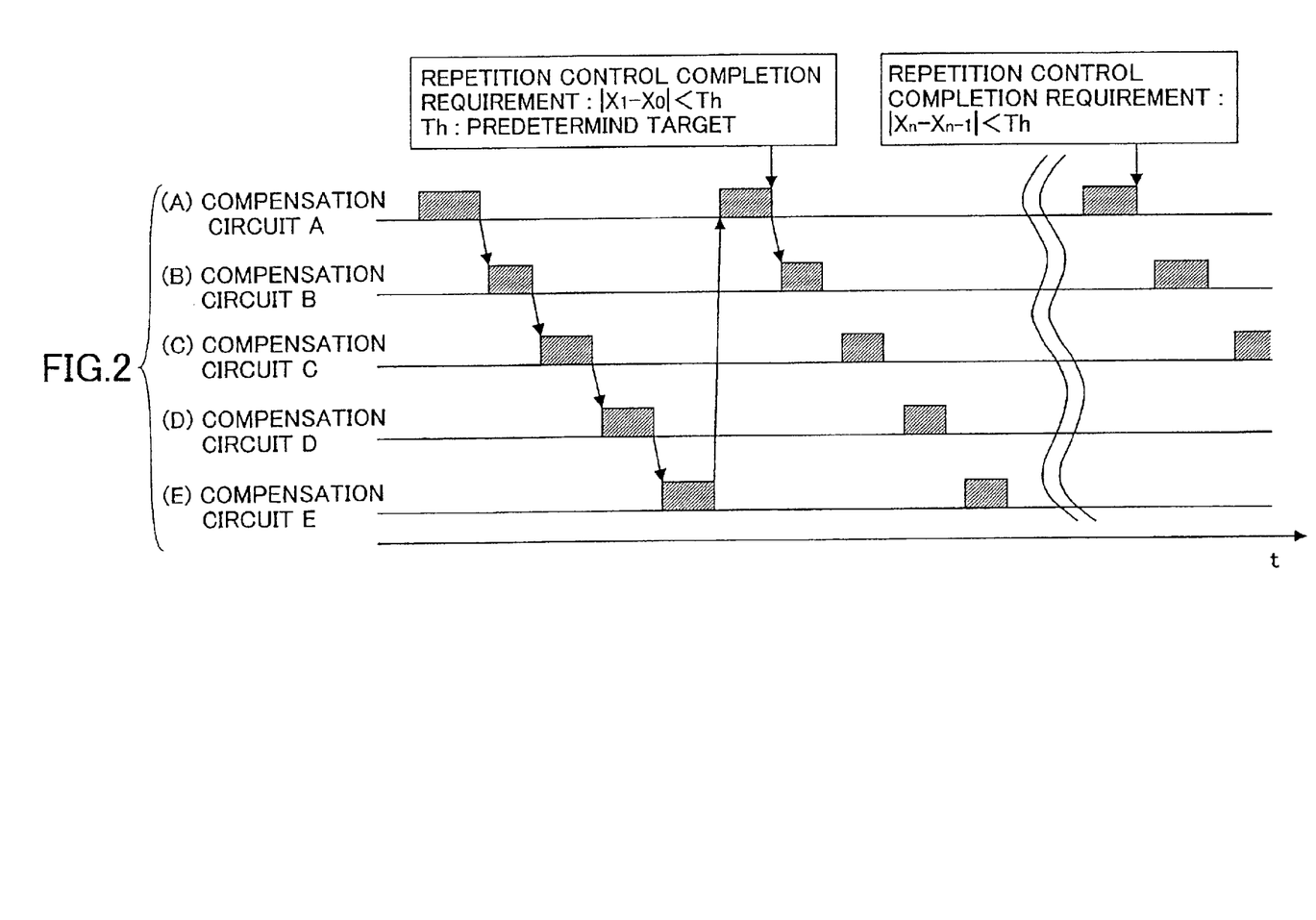
FIG. 2 shows a time chart for illustrate the principle of the present invention.

The control direction circuit 14 supplies code error information only to the control unit included in the compensation circuit of the compensation circuits 10a through 10e which actually performs control operation currently, as shown in FIG. 2.

FIG. 2 shows a time chart illustrating a principle of the present invention. In the time chart of FIG. 2, at a time a signal level changes from a low level to a high level, supply of code error information from the control direction circuit 14 to each of the control units 11a through 11e starts, while at a time the signal level returns from the high level to the low level, the supply of code error information from the control direction circuit 14 to each of the control units 11a through 11e ends.

In other words, each of the control units 11a through 11e operates only during the high level of the signal shown in FIG. 2. Moreover, the time chart of FIG. 2 shows an example in which parameter control is made in the stated order of the compensation circuits 10a through 10e, one by one.

As shown in FIG. 2, (A), the control direction circuit 14 transmits code error information to the control unit 11a first. The control unit 11a sets up parameters based on the received code error information. The compensation circuit 10a compensates waveform degradation on the transmission signal according to the thus-set-up parameters.

At this time, the control direction circuit 14 does not transmit the code error information to the control units 11b through 11e as shown in FIG. 2, (B) through (E). The control units 11b through 11e do not perform setting up of parameters as they do not receive the code error information. Therefore, the parameters in the compensation circuits 10b through 10e are left unchanged.

After a setup of the optimum parameters in compensation circuit 10a is completed by processing which will be described later, the control unit 11a transmits a notice of the completion of control to the control direction circuit 14, and ends the operation. The control direction circuit 14 then starts transmission of code error information to the subsequent control unit 11b, after receiving the notice of the completion of control from the control unit 11a, as shown in FIG. 2, (A) and (B).

Then, setup of the optimum parameters in the compensation circuits 10b through 10e are made in the same manner as in the compensation circuit 10a mentioned above. Then, after that, the optimum parameters in the compensation circuit 10a are set up again.

Then the control direction circuit 14 compares a difference between an optimum parameter $x_{n-1}$ at the last time with a currently set-up optimum parameter $x_n$ in the compensation circuit 10a from a predetermined target value, and when the difference is smaller than the target value, it finishes the transmission of code error information to the control units 11a through 11e. However, when the difference is larger than the target value, setup of the optimum parameters in the compensation circuits 10a through 10e is repeated.

In addition, the control direction circuit 14 finishes the operation, when the code error information supplied from the code error monitor circuit 13 indicates no code error existence. However, the control direction circuit 14 may continue setting up of the optimum parameters in all the compensation circuits even when the code error information provided by the control direction circuit 13 indicates no code error existence.

According to the present invention described above, in case a new compensation circuit is added to the configuration shown in FIG. 1, this can be coped with merely by software change in the control direction circuit 14. Thereby, the transmission characteristic compensation control system with high extendibility and pliability can be achieved.

Figure 3:
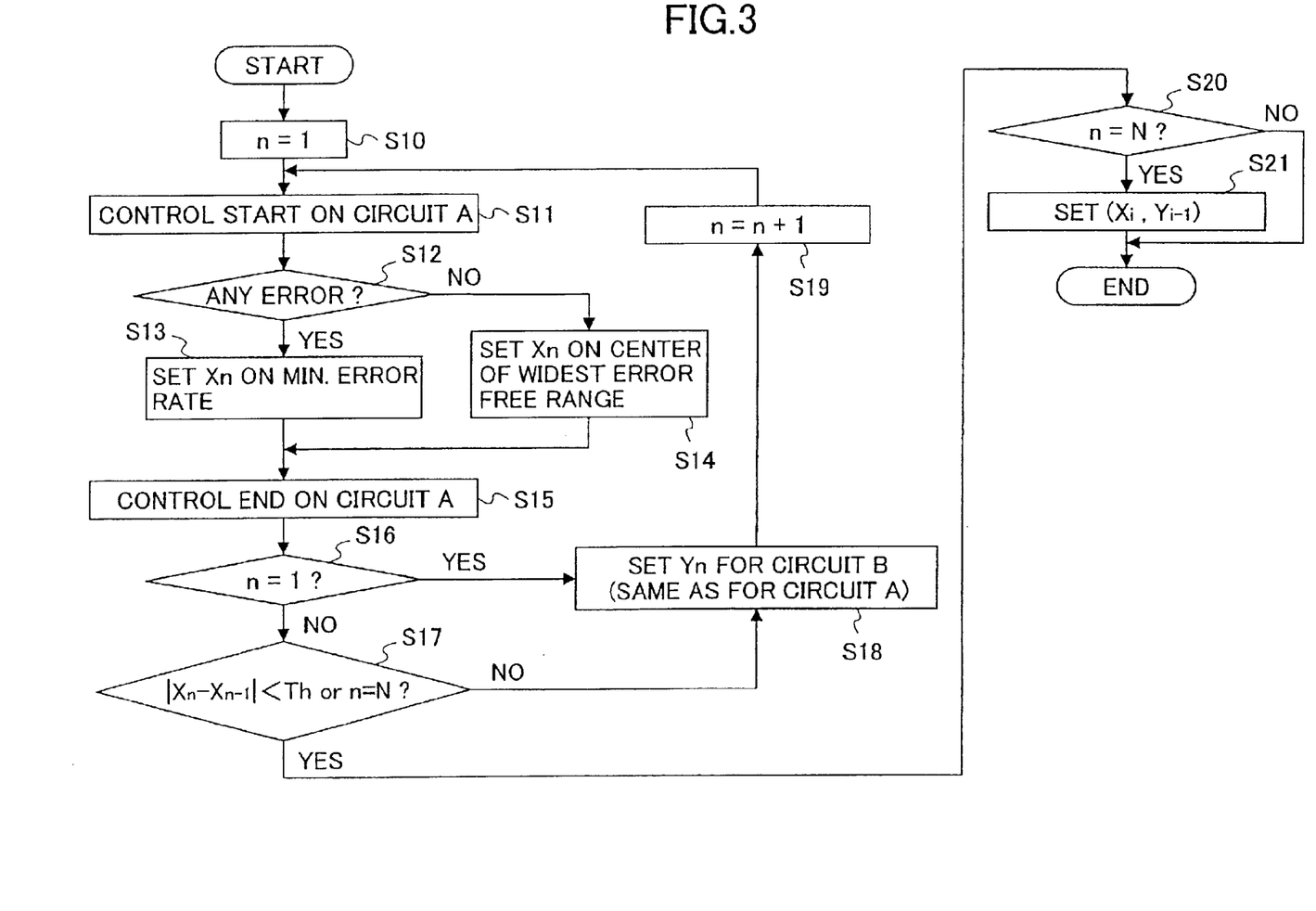
FIG. 3 shows an operation flow chart of a parameter optimizing algorithm according to the present invention.

With reference to FIG. 3, (parameter) optimization algorithm which sets up the optimum parameters by such a transmission characteristic compensation control system according to the present invention will now be described. FIG. 3 shows an operation flow chart of an example of the optimization algorithm according to the present invention.

The flow chart of FIG. 3 shows the optimization algorithm in case the number of compensation circuits included in the transmission characteristic compensation control system is two. Since optimization algorithm is different between at an initial setup stage and at an actual (regular) operation stage, description is made separately therefor.

First, the optimization algorithm at the time of initial setup will now be described. In the transmission characteristic compensation control system according to the present invention, since a transmission characteristic differs according to the fiber length of the transmission path, the type of the fiber, wavelength, etc., the parameters optimum at the time of initial starting are set in the compensation circuits.

In a step S10, the control direction circuit 14 sets 1 as the number n of repetition times. In a step S11 following to the step S10, the control direction circuit 14 transmits code error information to the control unit of the compensation circuit A, and makes the compensation circuit A start parameter control.

Figure 4A:
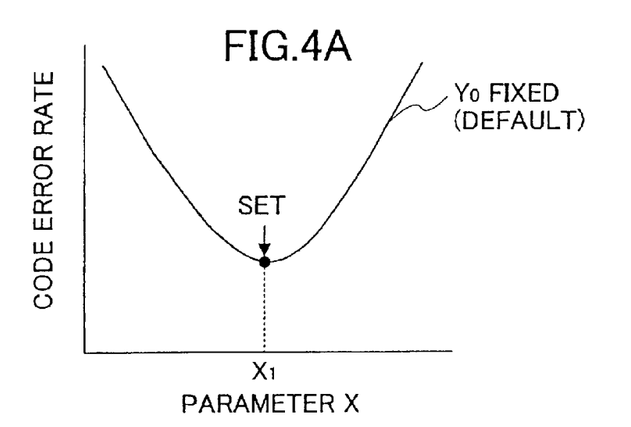
FIGS. 4A through 4D and FIGS. 5A through 5D illustrate parameter optimizing control performed in compensation circuits shown in FIG. 1.
Figure 4B:
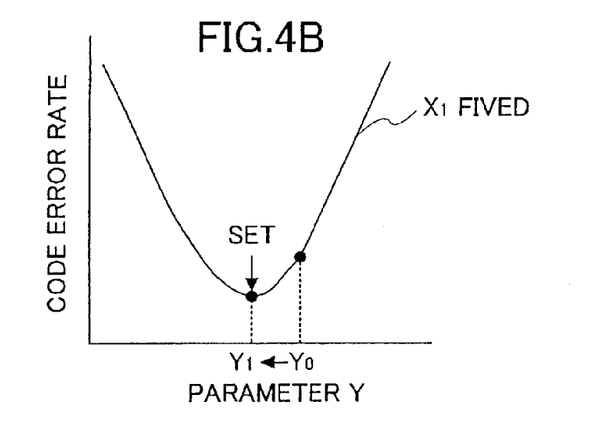

The control unit of the compensation circuit A thus changes a parameter x and acquires a code error rate on each value of the thus-changed parameter x, as shown in FIG. 4A. A parameter y on the other compensation circuit B is fixed as $y_0$ at this time. FIGS. 4A through 4D illustrate parameter control performed by the compensation circuits. In FIGS. 4A through 4D, the parameter in the compensation circuit A is referred to as x, and the parameter in the compensation circuit B is referred to as y.

In a step S12 following the step S11, the control unit in the compensation circuit A selects the minimum code error rate out of the code error rates acquired in the step S11, and determines as to whether or not an error is substantially included from the thus-selected minimum code error rate. When it is determined that an error is substantially included from the minimum code error rate (Yes in the step S12), the control unit of the compensation circuit A progresses to a step S13, and sets up the parameter $x_1$ used when the minimum code error rate was acquired, as a current optimum value $x_1$.

However, when it is determined that no error is substantially included from the minimum code error rate (No in the step S12), the control unit of the compensation circuit A rather progresses to a step S14, and sets up the parameter $x_1$ used when a so-called error free state in which no error is substantially included was acquired, as the current optimum value $x_1$. When there is a range (or ranges) of the parameter x1 on which the error free state was acquired, the central value in the widest range of the parameter $x_1$ on which the error free state is acquired is set up as the optimum value $x_1$.

In a step S15 following the step S13 or S14, the control unit of the compensation circuit A transmits the notice of completion of control to the control direction circuit 14, and completes the parameter control. Then, the operation is continued to a step S16 following the step S15, and, the control direction circuit 14 determines whether or not the number n of repetition times is 1.

When it is determined that the number n of repetition times is 1 (Yes in the step S16), the control direction circuit 14 sets the optimum value $y_1$ in the compensation circuit B in a step S18, in the same manner as in the steps S11 through S15 described above for the compensation circuit A.

Then, in a step S19 following the step S18, the control direction circuit 14 adds 1 to the number n of repetition times. Then, in a step S11, following the step S19, the control direction circuit 14 transmits code error information to the control unit of the compensation circuit A again, and makes the compensation circuit A start parameter control again.

Figure 4C:
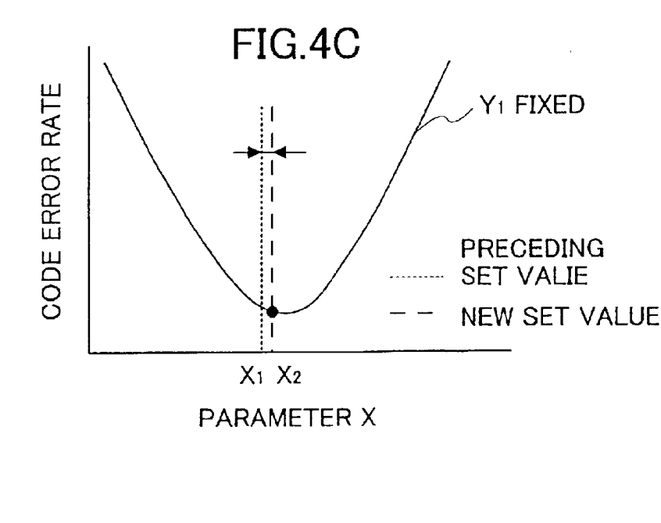
Figure 4D:
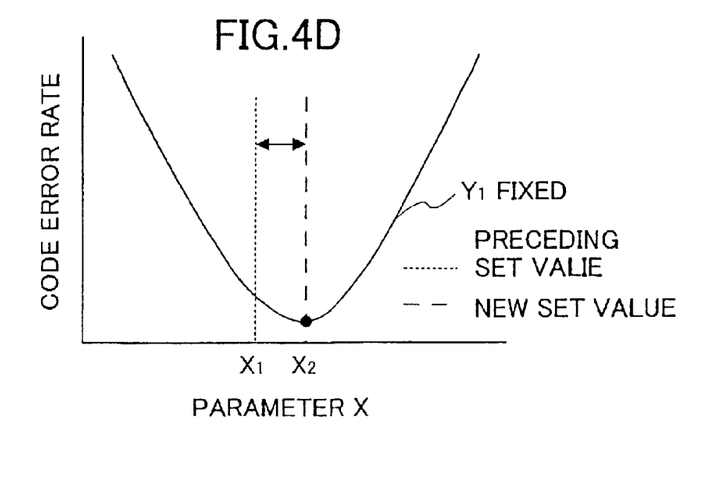

The control unit of the compensation circuit A changes the parameter x, and acquires the code error rate on the thus-changed parameter x, as shown in FIG. 4C. The parameter y is fixed as $y_1$ (set through the step S18) at this time. The optimum value $x_2$ in the compensation circuit A is set up by processing in the steps, S11 through S15 in the same manner as that described above.

In the step S15, the control unit of the compensation circuit A transmits the notice of completion of control to the control direction circuit 14, and completes the parameter control. Then, in the step S16 following the step S15, the control direction circuit 14 determines whether or not the number n of repetition times is 1.

When it is determined that the number n of repetition times is not 1 (No in the step S16), the control direction circuit 14 progresses to the step S17. In the step S17, the control direction circuit 14 calculates a difference between the preceding optimum value $x_1$ and the current optimum value $x_2$, and then, determines whether or not the absolute value of the thus-calculated difference is smaller than a target value Th. Moreover, the control direction circuit 14 determines whether or not the number n of repetition times has reached a predetermined maximum number N of repetition times.

For example, when it is determined that the thus-calculated absolute value of the difference between $x_{n-1}$ and $x_n$ is not larger than the target value Th as shown in FIG. 4C (Yes in the step S17), the control direction circuit 14 sets the optimum value $x_n$ and the optimum value $y_{n-1}$ as the final optimum value x and final optimum value y, and it progresses to a step S20.

However, when it is determined that the calculated absolute value is larger than the target value Th and also, the number n of repetition times has not yet reached the above-mentioned number N of maximum repetition times (No in the S17), the control direction circuit 14 progresses to the step S18, and repeats setting up of the optimum value $y_n$ and the optimum value $x_{n+1}$.

In the step S20, it is determined whether or not the number n of repetition times has reached the number N of maximum repetition times, repeatedly, by the control direction circuit 14. When it is determined that the number n of repetition times has reached the number N of maximum repetition times (Yes in the step S20), the control direction circuit 14 progresses to a step S21.

In the step S21, the control direction circuit 14 sets the optimum value $x_n$ and optimum value $y_{n-1}$ used when the above-mentioned calculated absolute value is the minimum one, as the final optimum value x and final optimum value y, and finishes the processing. In addition, when it is determined that the number n of repetition times has not yet reached the number N of maximum repetition times (No in the step S20), the control direction circuit 14 also finishes the processing.

Optimization algorithm at a time of regular operation according to the present invention will now be described. In the transmission characteristic compensation control system according to the present invention, since waveform degradation on the transmission signal arises due to change in wavelength dispersion in the fiber occurring due to temperature fluctuation, change in polarization dispersion, etc., parameters optimum are set in the compensation circuit at a time of actual regular operation each time.

For example, when waveform degradation in the transmission signal develops due to change in wavelength dispersion in the fiber occurring due to temperature change, change in polarization dispersion, etc. at a time regular operation, the code error monitor circuit 13 detects code error occurring accordingly. When the code error rate exceeds a predetermined resetting operation start threshold, the control direction circuit 14 transmits the code error information to the control units of the compensation circuits A and B in a predetermined order, and makes the compensation circuits A and B start the parameter control according to the flow chart shown in FIG. 3.

Figure 5A:
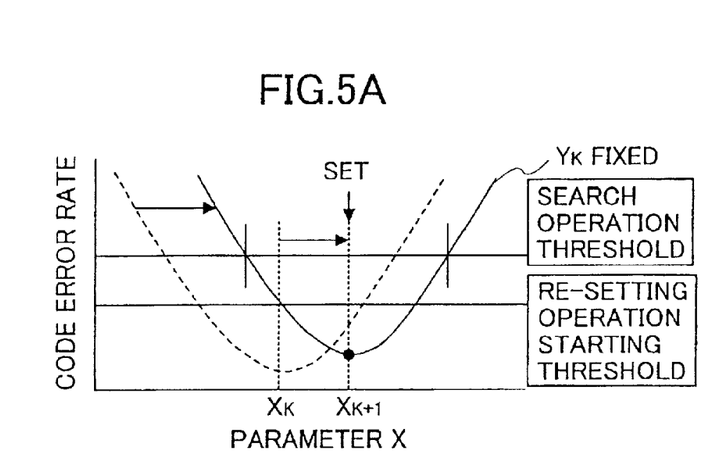

In processing according to the flow chart of FIG. 3, the difference between the optimization algorithm at a time of initial setup described above and the optimization algorithm at a time of regular operation is particularly in the steps S11 and S18. It is necessary to suppress the influence on currently provided service as small as possible in the optimization algorithm for a time of regular operation. The control unit of the compensation circuit A therefore changes the parameter x within a range from the value $x_k$ (set by the preceding optimizing operation) such that a predetermined search operation threshold is not exceeded by the code error rate, as shown in FIG. 5A, and obtains code error rates on respective values of the thus-changed parameter x.

FIGS. 5A through 5D illustrate parameter control operation performed by the compensation circuit for regular operation. In FIGS. 5A through 5D, the parameter of the compensation circuit A is referred to as x, and the parameter of the compensation circuit B is referred to as y, as same as in the above description. The parameter y is fixed as $y_k$ (set by the preceding optimizing operation) at this time.

Figure 5B:
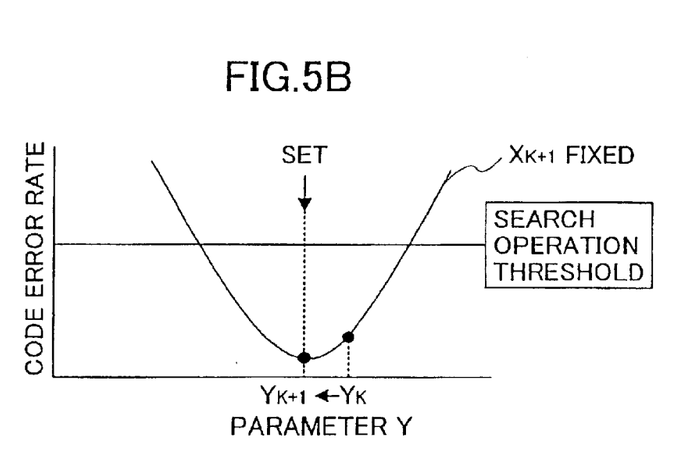
Figure 5C:
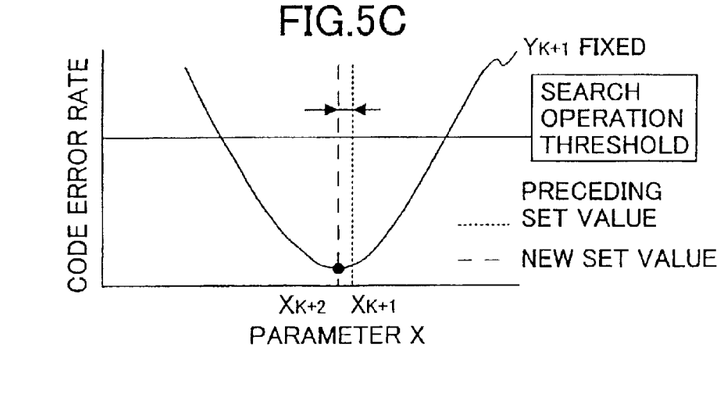
Figure 5D:
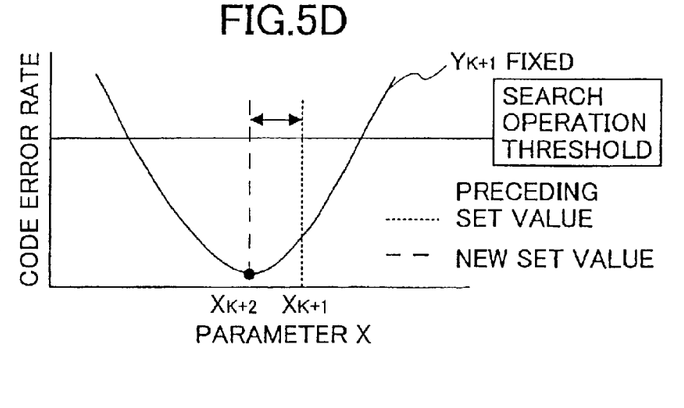

Similarly, the control unit of the compensation circuit B changes the parameter y within a range such that the code error rate thereon may not exceed a predetermined search operation threshold as shown in FIG. 5B, and acquires the code error rates on respective values of the thus-changed parameter y. The other processing is the same between on the optimization algorithm for initial setup described above and on the optimization algorithm for regular operation, and duplicated description will be omitted.

In the optimization algorithm for regular operation, in case the code error rate does not change even when the parameter x or parameter y is changed, as it may be determined that a cause occurring the relevant code error is in the other parts of the system, and, thus, the parameters x and y may be returned to the original values.

Thus, by using the optimization algorithm of FIG. 3, as optimizing operation is rather simple in comparison in particular to a case where parameter control on a plurality compensation circuits is made in a centralized manner mentioned above, search for the optimum parameters can be achieved at a high speed, and compensation control capability should be improved on waveform degradation occurring due to temperature change, polarization dispersion, etc. on the optical fiber. Consequently, the transmission characteristic compensation control system according to the present invention can have very high reliability.

Figure 6:
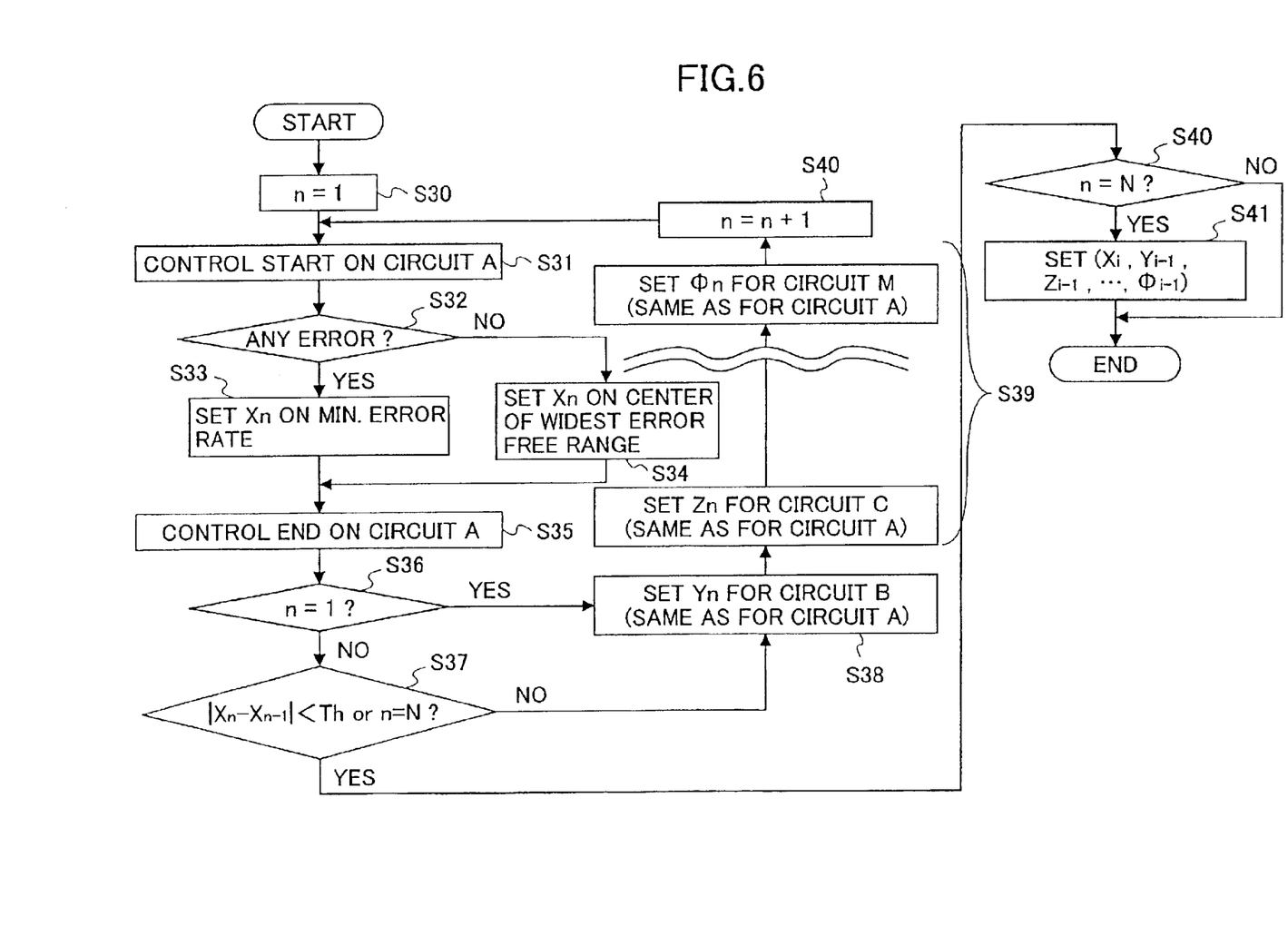
FIG. 6 shows another operation flow chart of a parameter optimizing algorithm according to the present invention.

With reference to FIG. 6, the optimization algorithm which sets up the optimum parameters by the transmission characteristic compensation control system according to one embodiment of the present invention will now be described.

FIG. 6 shows a flow chart of another example of the optimization algorithm according to the present invention. Except for a certain part, the flow chart of FIG. 6 is the same as the flow chart of FIG. 3, and duplicated description will be omitted.

The flow chart of FIG. 6 shows the optimization algorithm in case the number of the compensation circuits included in the transmission characteristic compensation control system is M (M>2). Processing in steps S30 through S38 correspond to the above-described processing in the steps S10 through S18 of FIG. 3. The respective optimum values $z_1$ through $\phi_1$ in the compensation circuits C through M are set up, as in the above-mentioned steps S31 through S35, in steps S39 following the step S38.

Progressing to a step S40 following the step S39, the control direction circuit 14 adds 1 to the number n of repetition times. Progressing to the step S41 following the step S40, the control direction circuit 14 transmits the code error information to the control unit of the compensation circuit A, and makes the compensation circuit A start the parameter control. Then, the optimum value $x_2$ on the compensation circuit A is set up through processing in the steps S31 through S35 mentioned above.

Then, progressing to the step S36 following the step S35, the control direction circuit 14 determines whether or not the number n of repetition times is 1, and, when it is determined that the number n of repetition times is not 1 (No in the step S36), the step S37 is performed. In the step S37, when it is determined that the thus-calculated absolute value is smaller than the target value Th (Yes in the step S37) by the same processing as in the step S17 of FIG. 3, the optimum value $x_n$ and the optimum value $y_{n-1}$ are set up as the final optimum values x and y, and, then, the step S41 is performed. Moreover, when it is determined that the number n of repetition times has reached the number N of the maximum repetition times (Yes in the step S37), also the control direction circuit 14 performs the step S41.

When it is determined that the calculated absolute value is larger than the target value Th, and, also, the number n of repetition times has not reached the number N of maximum repetition times (No in the step S37), the control direction circuit 14 performs the step S38, and repeats the operation of setting up of the optimum value $y_n$, the optimum values $z_n$ through the optimum value $\phi_n$ and the optimum value $x_{n+1}$.

In the step S41, it is determined whether or not the number n of repetition times has reached the number N of the maximum repetition times, repeatedly by the control direction circuit 14. Then, when it is determined that the number n of repetition times has reached the number N of the maximum repetition times (Yes in the S41), the control direction circuit 14 performs a step S42.

In the step S42, the control direction circuit 14 sets up the optimum value $x_n$, the optimum value $y_{n-1}$, and the optimum value $z_{n-1}$, through $\phi_{n-1}$ as the final optimum values x, y, and z through $\phi$, and finishes the current processing. When it is determined that the number n of repetition times has not reached the number N of maximum repetition times (No in the step S41), the control direction circuit 14 finishes the processing without performing the step S42 at this case.

In addition, influence on the actually performed service can be made still smaller by employing error correction code in the transmission characteristic compensation control system according to the present invention. Specifically, as a result of information on the number of occasions of code error before error correction or code error correction being monitored by the code error monitoring circuit 13 shown in FIG. 1, it is possible that the parameters in the compensation circuits are set up before the code error occurs in the transmission circuit in a degree such as to exceed the error correction capability of the communication system.

In this case, by previously setting the re-setting operation start threshold corresponding to the number of occasions of code error before error correction or code error correction before exceeding the error correction capability of the system, it is possible that the parameters in the compensation circuits are set up before the code error occurs in the transmission circuit in a degree such as to exceed the error correction capability of the communication system.

Figure 7:
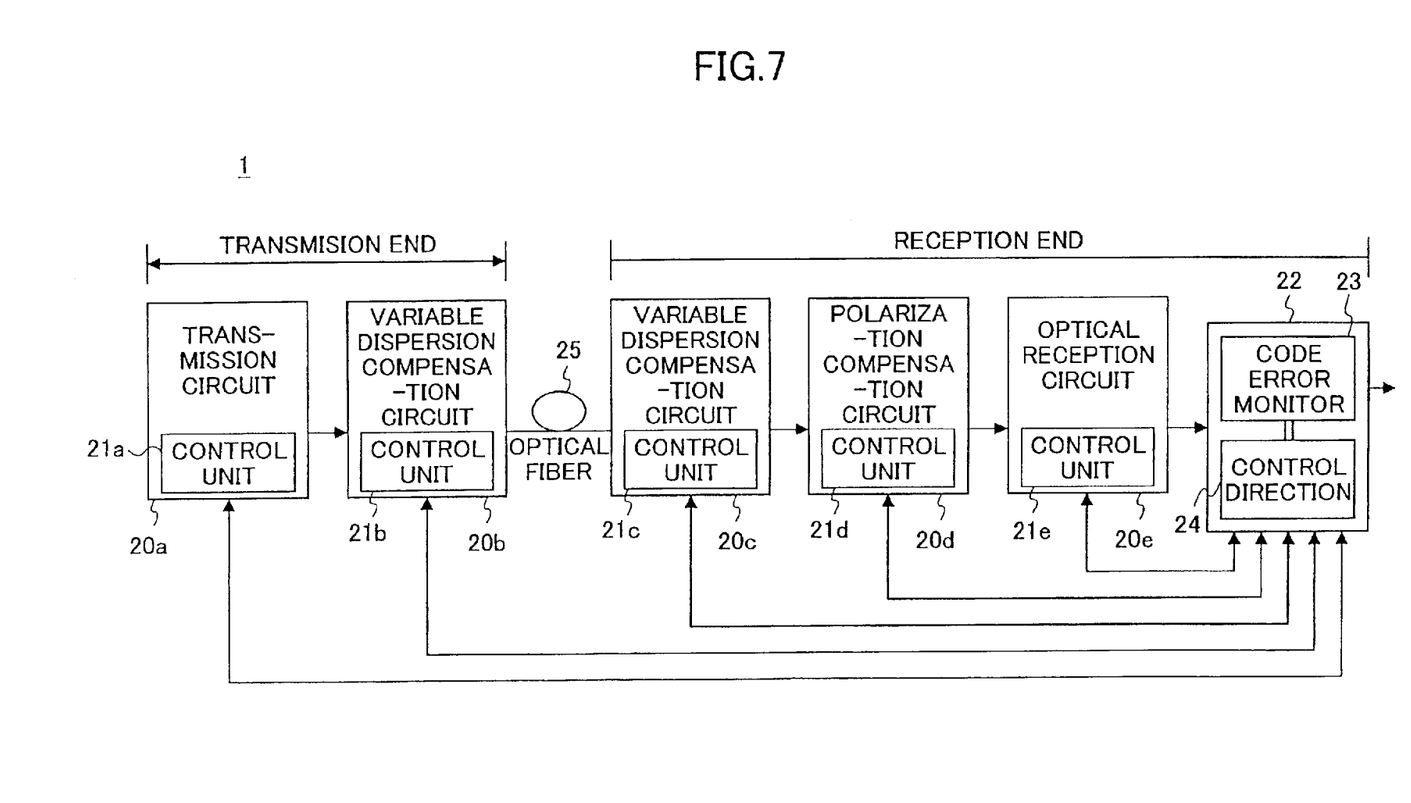
FIG. 7 shows a configuration of a transmission characteristic compensation control system in one embodiment of the present invention.

FIG. 7 shows a configuration of one embodiment of a transmission characteristic compensation control system according to the present invention. This transmission characteristic compensation control system includes a transmitting circuit 20a and a variable dispersion compensation circuit 20b at a transmission end, and, also, a variable dispersion compensation circuit 20c, a polarization dispersion compensation circuit 20d, an optical reception circuit 20e, and a transmission characteristic compensation control device 22 are arranged at a reception end of the optical signal transmission system.

The transmission and reception ends are connected with one another through an optical fiber 25. The transmitting circuit 20a corresponds to the compensation circuit 10a of FIG. 1, the variable dispersion compensation circuit 20b corresponds to the compensation circuit 10b, variable dispersion compensation circuit 20c corresponds to the compensation circuit 10c, the polarization dispersion compensation circuit 20d corresponds to the compensation circuit 10d, the optical reception circuit 20e corresponds to the compensation circuit 10e, and the transmission characteristic compensation control device 22 corresponds to the transmission characteristic compensation control device 12.

The transmitting circuit 20a has such a general configuration as to include a semiconductor laser, an LN modulator, a driver, and so forth, and includes a control circuit 21a for chirp variation. Each of the variable dispersion compensation circuits 20b and 20c has a configuration including variable dispersion compensator and a control unit 21b or 21c.

As a variable wavelength dispersion compensation device as the variable dispersion compensator, a VIPA (Virtually-Imaged-Phased-Array) device (see M. Shirasaki, et. al., "Dispersion Compensation Using The Virtually Imaged Phased Array", APPC/OECC '99, pp.1367–1370), an FBG (Fiber-Bragg-Grating) (see M. M. Ohn et. al., "Tunable Fiber Grating Dispersion Using a Piezoelectric Stack", OFC '97 WJ3), or the like, may be employed.

The polarization dispersion compensation circuit 20d includes a polarization controller, a double refraction device, a polarization monitor, and a control circuit 21d. The optical reception circuit 20e includes a photoelectric device, an amplifier, a clock reproduction and identification circuit, a serial-to-parallel conversion circuit, and a control circuit 21e controlling identification level.

The transmission characteristic compensation control device 22 includes a code error monitor circuit 23 and a control direction circuit 24 as in the same shown in FIG. 1. The control circuits 21a through 21e have either code error information or code error correction information provided thereto by the control direction circuit 24 according to the timing shown in FIG. 2.

The control units 21a through 21e can set up parameters in the transmitting circuit 20a, variable dispersion compensation circuit 20b, variable dispersion compensation circuit 20c, polarization dispersion compensation circuit 21d, and optical reception circuit 20e based on either the thus-provided code error information or code error correction information, as described above with reference to FIG. 1 on the control circuits 11a through 11e.

Accordingly, the transmitting circuit 20a, variable dispersion compensation circuit 20b, variable dispersion compensation circuit 20c, polarization dispersion compensation circuit 21d, and optical receiving circuit 20e can compensate waveform degradation on the transmission signal according to the parameters thus set up.

In case where error correction code is not used, error information based on parity check such as B1, B2 on SDH/SONET format, FCS (Frame Check Sequence) on LAN format, or the like, may also be utilized.

Such a transmission characteristic compensation control system according to the present invention may be applied to an optical fiber communication system which performs wavelength multiplex transmission, and can compensate a transmission characteristic for every wavelength, or can perform variable dispersion compensation on a plurality of wavelengths collectively.

Further, the present invention is not limited to the above-described embodiments, and variations and modifications may be made without departing from the scope of the present invention.

The present application is based on Japanese priority application No. 2001-283803, filed on Sep. 18, 2001, the entire contents of which are hereby incorporated by reference.

What is claimed is:

1. A method of compensating waveform degradation on a transmission signal by using a plurality of compensation circuits, comprising:
    providing at least one of code error information and code error correction information on the compensated transmission signal; and
    selecting one of the plurality of compensation circuits and controlling the selected compensation circuit based on the provided information to compensate the waveform degradation on the transmission signal.

2. The method as claimed in claim 1, wherein said plurality of compensation circuits performs at least two of output power control, chirp parameter control, transmission-end variable dispersion compensation control, polarization dispersion compensation control, reception-end variable dispersion compensation control, reception-end identification level control and identification phase control.

3. The method as claimed in claim 1, wherein said selecting comprises selecting one of the plurality of compensation circuits one by one, and said providing comprises providing to the thus-selected one at least one of the code error information and code error correction information.

4. The method as claimed in claim 3, wherein said providing stops provision of the at least one of the code error information and code error correction information when substantially no more code error or code error correction occurs.

5. The method as claimed in claim 3, wherein said providing continues operation of providing the at least one of the code error information and code error correction information until the difference between a current set value and a preceding set value controlling the compensation circuit becomes smaller than a predetermined target value.

6. The method as claimed in claim 3, wherein said providing starts provision of the at least one of the code error information and code error correction information when at least one of code error rate or code error correction rate on the transmission signal exceeds a predetermined threshold.

7. The method as claimed in claim 1, wherein said plurality of compensation circuits comprises those provided in both a transmission end and a reception end of transmission of the transmission signal.

8. A transmission characteristic compensation apparatus which compensates waveform degradation on a transmission signal by using a plurality of compensation circuits, comprising:
- a providing unit which provides at least one of code error information and code error correction information on the compensated transmission signal; and
- a controlling unit which selects one of the plurality of compensation circuits and controls the selected compensation circuit based on the information provided by the providing unit to compensate the waveform degradation on the transmission signal.

9. A transmission characteristic compensation system for compensating waveform degradation on a transmission signal by using a plurality of compensation circuits, comprising:
- a providing unit which provides at least one of code error information and code error correction information on the compensated transmission signal; and
- a controlling unit which selects one of the compensation circuits and controls the selected compensation circuit based on the information provided by the providing unit to compensate the waveform degradation on the transmission signal.

10. A system comprising:
- a plurality of compensation units compensating waveform degradation on a transmission signal, to thereby produce a compensated transmission signal; and
- a controller which, in a sequential order for each of the plurality of compensation units, detects error information in the compensated transmission signal and provides the detected error information to the respective compensation unit so that the respective compensation unit compensates the waveform degradation in accordance with the provided error information.

11. A system as in claim 10, wherein each compensation unit comprises a control part which receives the error information and controls a compensating value based on the received error information.

12. A system comprising:
- a plurality of compensation units compensating waveform degradation on a transmission signal, to thereby produce a compensated transmission signal; and
- means for, in a sequential order for each of the plurality of compensation units, detecting error information in the compensated transmission signal and providing the detected error information to the respective compensation unit so that the respective compensation unit compensates the waveform degradation in accordance with the provided error information.

13. A apparatus comprising:
- a plurality of compensation units compensating waveform degradation on a transmission signal; and
- a controller detecting error information from the compensated transmission signal, selecting a respective compensation unit of the plurality of compensation units, and providing the detected error information to the selected compensation unit, wherein the selected compensation unit compensates the waveform degradation in accordance with the provided error information.

14. An apparatus as in claim 13, wherein the controller selects the compensation units and provides the detected error information to the selected compensation units in sequence.

15. A system comprising:
- a plurality of compensators serially arranged to compensate waveform degradation on a transmission signal, to thereby produce a compensated transmission signal; and
- a controller which, in a sequential order for each of the plurality of compensators, detects error information in the compensated transmission signal and provides the detected error information to the respective compensator so that the respective compensator compensates the waveform degradation in accordance with the provided error information.

16. A system comprising:
- a plurality of compensators serially arranged to compensate waveform degradation on a transmission signal, to thereby produce a compensated transmission signal; and
- means for, in a sequential order for each of the plurality of compensators, detecting error information in the compensated transmission signal and providing the detected error information to the respective compensator so that the respective compensator compensates the waveform degradation in accordance with the provided error information.

17. A system comprising:
- first and second compensators arranged in series to compensate waveform degradation on a transmission signal in accordance with error information provided to the first and second compensators, to thereby produce a compensated transmission signal having waveform degradation compensated by both the first and second compensators; and
- a controller
  - detecting error information at a first time from the compensated transmission signal, and providing the error information detected at the first time to the first compensator so that the first compensator, but not the second compensator, compensates for waveform degradation in accordance with the error information detected at the first time, and
  - detecting error information at a second time, after the first time and after the first compensator compensates for waveform degradation in accordance with the error information detected at the first time, from the compensated transmission signal, and providing the error information detected at the second time to the second compensator so that the second compensator, but not the first compensator, compensates for waveform degradation in accordance with the error information detected at the second time.

18. A system comprising:
- first and second compensators arranged in series to compensate waveform degradation on a transmission signal in accordance with error information provided to the first and second compensators, to thereby produce a compensated transmission signal having waveform degradation compensated by both the first and second compensators; and
- means for detecting error information at a first time from the compensated transmission signal, and for providing the error information detected at the first time to the first compensator so that the first compensator, but not the second compensator, compensates for waveform degradation in accordance with the error information detected at the first time, and means for detecting error information at a second time, after the first time and after the first compensator compensates for waveform degradation in accordance with the error information detected at the first time, from the compensated transmission signal, and for providing the error information detected at the second time to the second compensator so that the second compensator, but not the first compensator, compensates for waveform degradation in accordance with the error information detected at the second time.

* * * * *